United States Patent
Uesaka et al.

(10) Patent No.: US 11,468,026 B2
(45) Date of Patent: Oct. 11, 2022

(54) INFORMATION PROCESSING APPARATUS, INFORMATION PROCESSING METHOD, AND RECORDING MEDIUM RECORDING INFORMATION PROCESSING PROGRAM

(71) Applicant: FUJITSU LIMITED, Kawasaki (JP)

(72) Inventors: Kouji Uesaka, Kawasaki (JP); Taizan Kobayashi, Kawasaki (JP); Reizo Nakamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 361 days.

(21) Appl. No.: 16/785,954

(22) Filed: Feb. 10, 2020

(65) Prior Publication Data
US 2020/0265029 A1     Aug. 20, 2020

(30) Foreign Application Priority Data

Feb. 15, 2019  (JP) .............................. JP2019-025145

(51) Int. Cl.
*G06F 16/22* (2019.01)
*G06F 16/23* (2019.01)

(52) U.S. Cl.
CPC ........ *G06F 16/2246* (2019.01); *G06F 16/235* (2019.01); *G06F 16/2358* (2019.01)

(58) Field of Classification Search
CPC . G06F 16/2246; G06F 16/235; G06F 16/2358
See application file for complete search history.

(56) References Cited

U.S. PATENT DOCUMENTS

| | | | | |
|---|---|---|---|---|
| 5,767,848 A | * | 6/1998 | Matsuzaki | G06Q 10/10 715/752 |
| 6,167,406 A | * | 12/2000 | Hoskins | G06F 16/21 715/767 |
| 6,268,853 B1 | * | 7/2001 | Hoskins | G05B 23/024 715/965 |
| 2003/0058706 A1 | * | 3/2003 | Okamoto | G06T 11/206 365/200 |
| 2007/0043635 A1 | * | 2/2007 | Hotta | G06Q 10/06 705/28 |
| 2019/0057530 A1 | * | 2/2019 | Yochum | G06Q 50/10 |

FOREIGN PATENT DOCUMENTS

| | | |
|---|---|---|
| JP | H11-345259 A | 12/1999 |
| JP | 2003-091547 A | 3/2003 |
| JP | 2006-127314 A | 5/2006 |
| JP | 2007-265250 A | 10/2007 |

* cited by examiner

*Primary Examiner* — Huawen A Peng
(74) *Attorney, Agent, or Firm* — Fujitsu Patent Center

(57) ABSTRACT

An information processing apparatus includes: a memory configured to store data generated in a manufacturing line where a product is manufactured in a state in which the data is linked to information in a tree structure in which elements related to manufacture of the product assigned as nodes; and a processor configured to: determine, when data of a prototype is stored to the memory, whether information of an element out of the elements corresponding to an uppermost node out of the nodes is linked to the data of the prototype; link, when the information of the element corresponding to the uppermost node is not linked, as the information of the element corresponding to the uppermost node of the data of the prototype, information distinguishable from information of the element corresponding to the uppermost node linked to the data of the product; and store the data of the prototype.

9 Claims, 16 Drawing Sheets

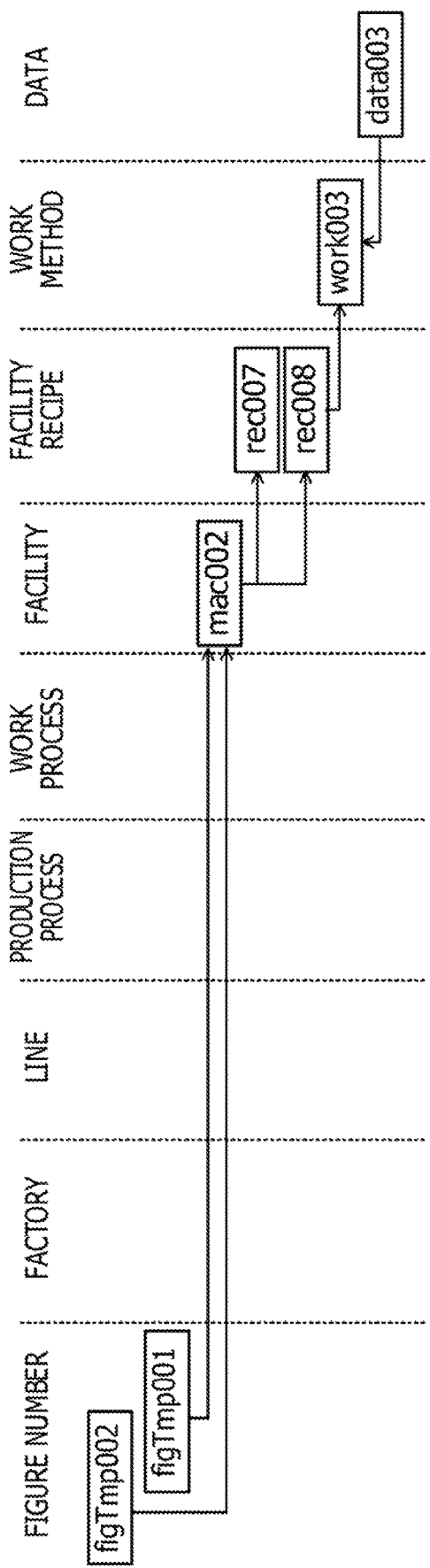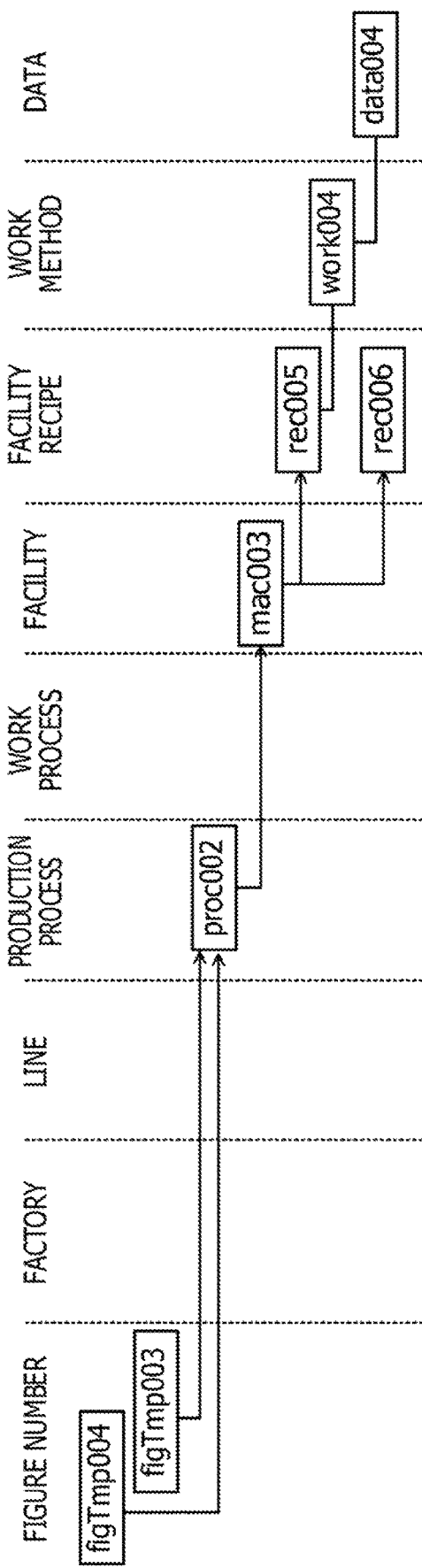

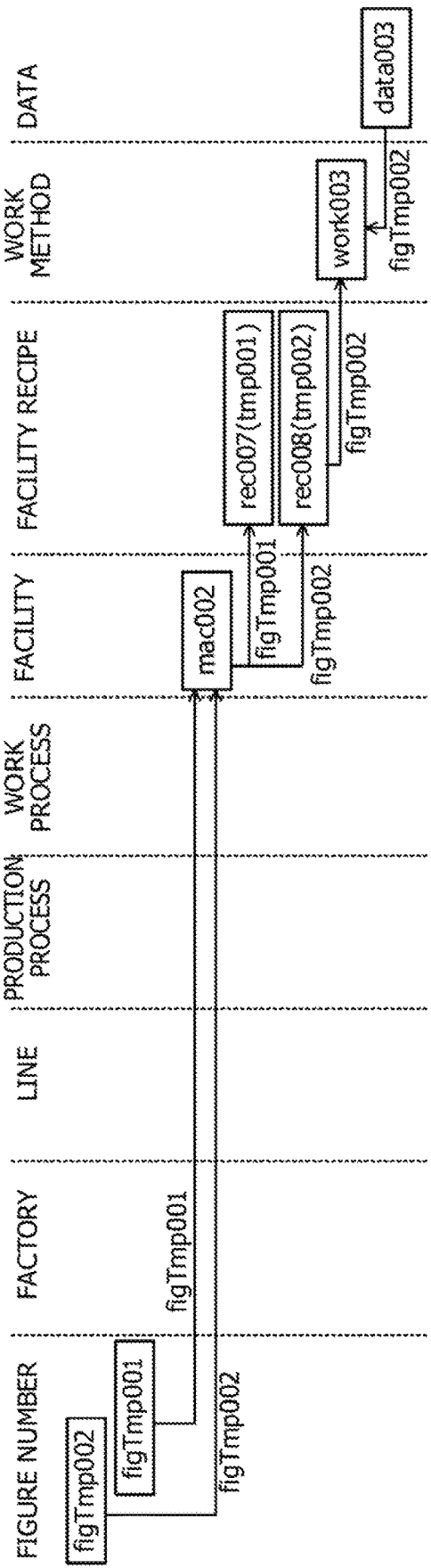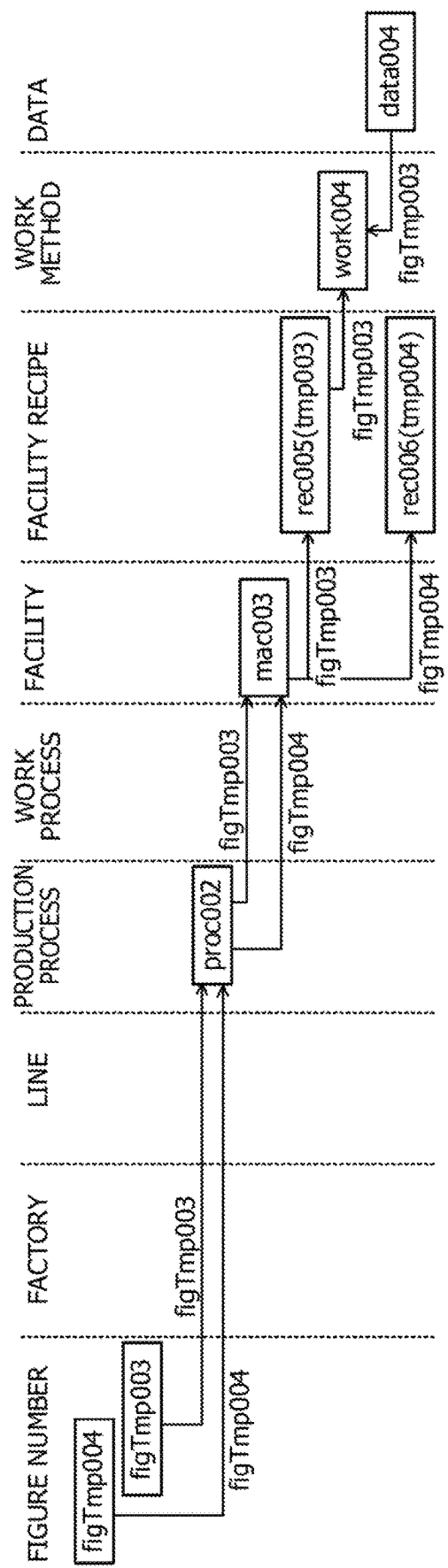

INFORMATION PROCESSING APPARATUS, INFORMATION PROCESSING METHOD, AND RECORDING MEDIUM RECORDING INFORMATION PROCESSING PROGRAM

CROSS-REFERENCE TO RELATED APPLICATION

This application is based upon and claims the benefit of priority of the prior Japanese Patent Application No. 2019-25145, filed an Feb. 15, 2019, the entire contents of which are incorporated herein by reference.

FIELD

The embodiment discussed herein is related to an information processing system, an information processing device, and a recording medium.

BACKGROUND

Nowadays, when data (inspection data or the like) related to products manufactured in a manufacturing line of a factory are stored to a database, the data is stored in accordance with various data formats. For example, in the database, inspection data may be stored in accordance with a data format having the following hierarchical structure: product figure number>manufacturing factory>manufacturing line>production process>work process>manufacturing facility>facility recipe>work method>data.

Examples of related art include Japanese Laid-open Patent Publication Nos. 2003-091547, 2006-127314, 11-345259 and 2007-265250.

SUMMARY

According to an aspect of the embodiments, an information processing apparatus includes: a memory configured to store data generated in a manufacturing line where a product is manufactured in a state in which the data is linked to information in a form of a tree structure in which elements related to manufacture of the product assigned as nodes; and a processor coupled to the memory and configured to: determine, when data of a prototype manufactured by using a facility in the manufacturing line is stored to the memory, whether information of an element out of the elements corresponding to an uppermost node out of the nodes of the tree structure is linked to the data of the prototype; link, when the information of the element corresponding to the uppermost node is not linked, as the information of the element corresponding to the uppermost node of the data of the prototype, information distinguishable from information of the element corresponding to the uppermost node of the tree structure linked to the data, of the product; and store in the memory the data of the prototype to which the distinguishable information is linked.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7A and FIG. 7B illustrate states in which temporary figure numbers are assigned to information of the prototypes illustrated in FIGS. 6A and 6B;

FIGS. 9A and 9B illustrate states in which figure numbers are added to the branches of the hierarchical structure illustrated in FIGS. 7A and 7B;

DESCRIPTION OF EMBODIMENTS

When a product is prototyped, a manufacturing line for manufacturing another product may be used. When storing data (inspection data or the like) of the prototype in accordance with the data format having, the above-described hierarchical structure, since many elements of information of the prototype are undefined, the data may be stored such that the data is associated with data of a product actually manufactured by using the manufacturing line. When the data of the prototype is associated with the data of the other product as described above, searching for the data of the prototype may become difficult.

In one aspect, an information processing system, an information processing device, and a recording medium with which data of a prototype is able to be appropriately stored may be provided.

An embodiment of an information processing system will be described in detail below with reference to FIGS. 1 to 15. The information processing system according to the present embodiment stores in a database product data (for example, inspection data such as a product image) manufactured in a manufacturing line of a factory. In the database, the product data is stored in accordance with a data format having a hierarchical structure. In the database, in addition to the product data, data of the prototype produced by using the manufacturing line of the factory is stored.

Figure 1:
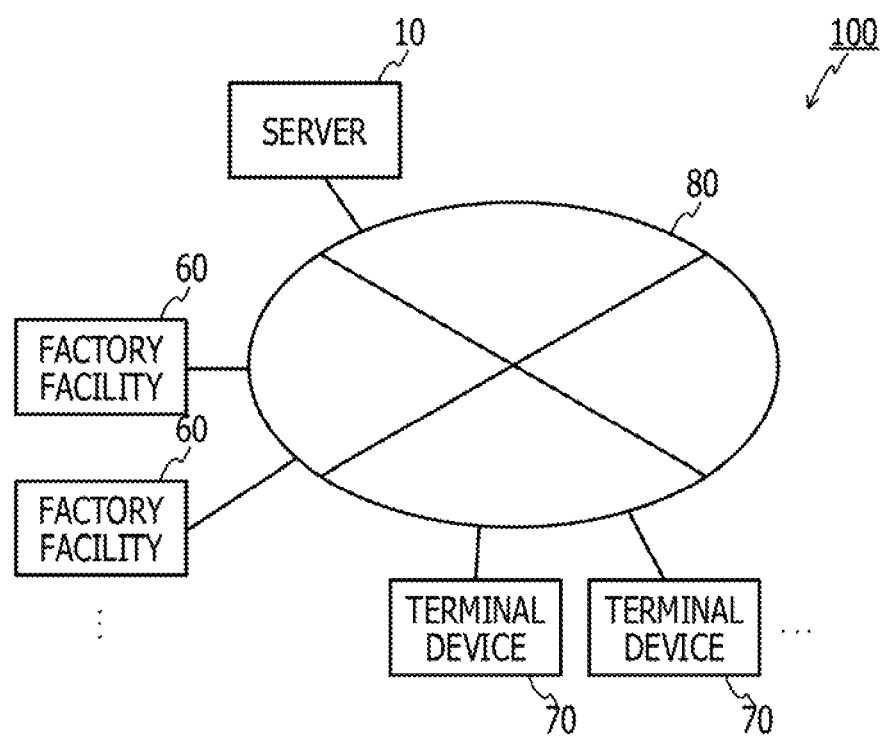
FIG. 1 schematically illustrates a configuration of an information processing system according to an embodiment.

FIG. 1 schematically illustrates a configuration of an information processing system 100 according to the present embodiment. As illustrated in FIG. 1, the information processing system 100 includes factory facilities 60, terminal devices 70, and a server 10 serving as an information processing device. The factory facilities 60, the terminal devices 70, and the server 10 are coupled to a network 80 such as the Internet or a local area network (LAN).

The factory facilities 60 each inspect a product manufactured in the factory, and obtains data (inspection data) of inspection results. The factory facility 60 transmits the obtained data to the server 10. In addition, in the factory, since a prototype is manufactured by using the manufacturing line in some cases, the factory facility 60 also obtains prototype data (inspection data). The data obtained by the factory facility 60 may be other data generated in the manufacturing line than the inspection data. For example, the data may indicate setting values or conditions of a manufacturing device when manufacturing the product or the prototype.

Each of the terminal devices 70 is a terminal used by an administrator or the like (hereinafter referred to as a "user") and links product information and prototype information to the data obtained in the factory facility 60 in accordance with input from the user. The product information linked to the data includes information of elements related to the manufacture of the product such as information of a "figure number" as identification information of the product, information of a "factory" where the product is manufactured, information of a "line" where the product is manufactured, information of a "production process", information of a "work process", information of a "manufacturing facility", information of "facility recipe", and information of "work method". Unlike the product information, the prototype information includes undetermined pieces of information. Accordingly, in some cases, part of the information included in the product information is not included in the prototype information.

Figure 2A:
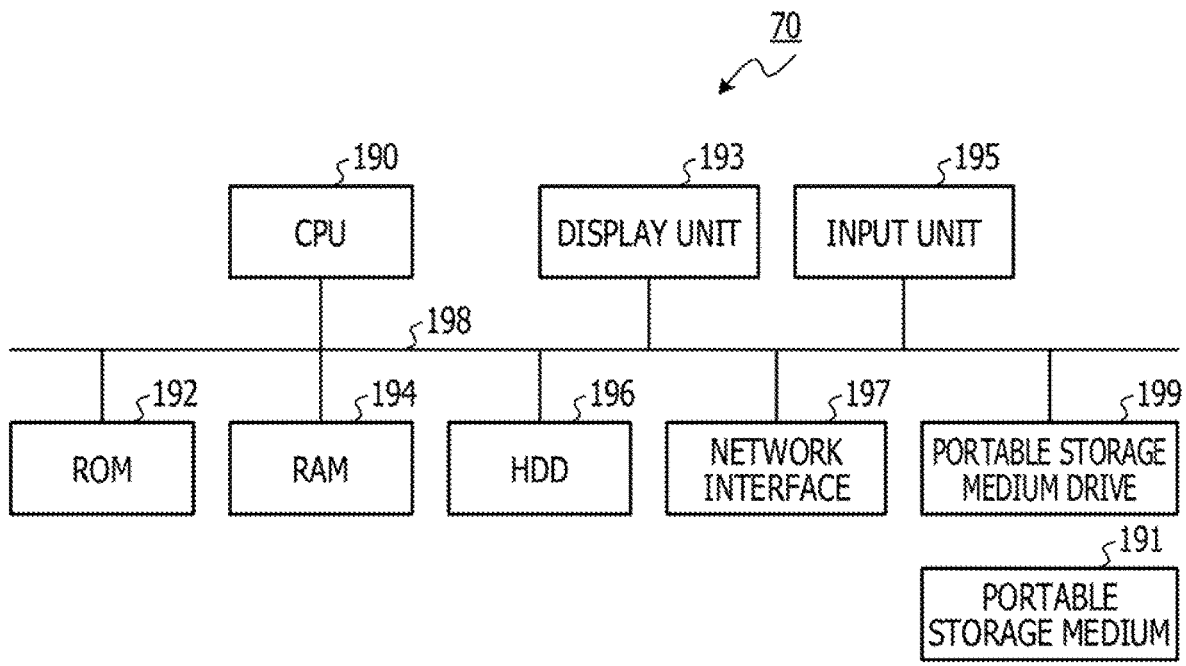
FIG. 2A illustrates a hardware configuration of a terminal device.
Figure 2B:
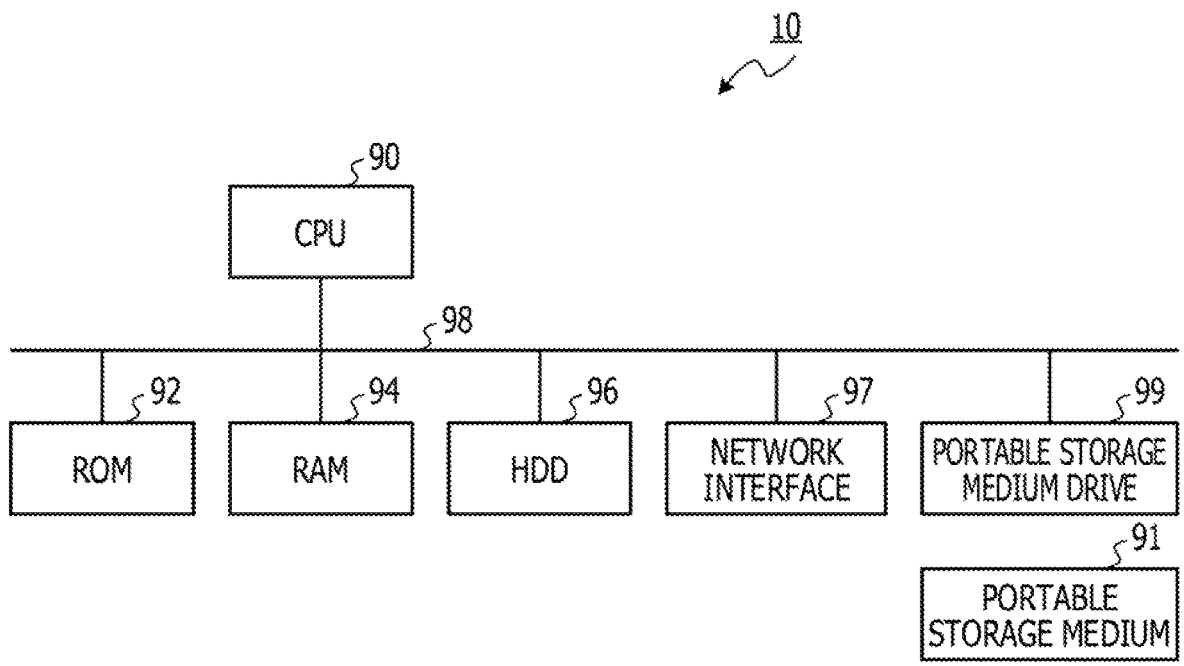
FIG. 2B illustrates a hardware configuration of a server.
Figure 3:
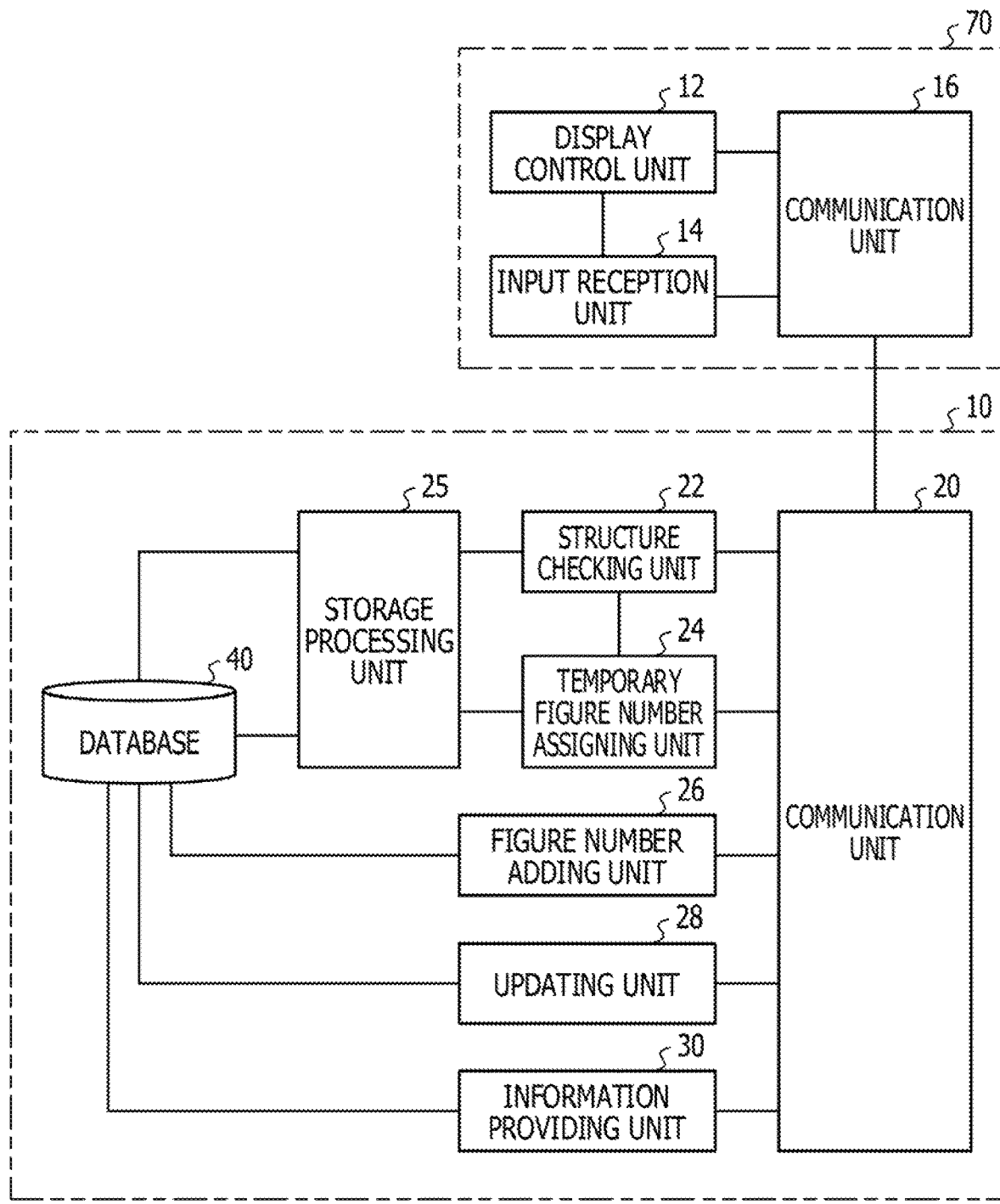
FIG. 3 is a functional block diagram of the terminal device and the server.

FIG. 2A illustrates a hardware configuration of the terminal device 70. As illustrated in FIG. 2A, the terminal device 70 includes, for example, a central processing unit (CPU) 190, a read-only memory (ROM) 192, a random-access memory (RAM) 194, a storage unit (hard disk drive (HDD) herein) 196, a network interface 197, a display unit 193, an input unit 195, and a portable storage medium drive 199. The display unit 193 includes a liquid crystal display or the like, and the input unit 195 includes a keyboard, a mouse, a touch panel, and the like. These components of the terminal device 70 are coupled to a bus 198. In the terminal device 70, functions of units illustrated in FIG. 3 are realized when the CPU 190 executes a program stored in the ROM 192 or the HDD 196 or a program read by the portable storage medium drive 199 from the portable storage medium 191. The functions of the units illustrated in FIG. 3 may be realized by an integrated circuit, such as an application specific integrated circuit (ASIC) or a field-programmable gate array (FPGA), for example. Details of the units illustrated in FIG. 3 will be described later.

Referring back to FIG. 1, the server 10 manages the inspection data received from the factory facilities 60. The server 10 also controls the product information and the prototype information linked by the users of the terminal devices 70 to the inspection data.

FIG. 28 illustrates a hardware configuration of the server 10. As illustrated in FIG. 28, the server 10 includes, for example, a CPU 90, a ROM 92, a RAM 94, a storage unit (HDD) 96, a network interface 97, and a portable storage medium drive 99. These components of the server 10 are coupled to a bus 98. In the server 10, functions of the units illustrated in FIG. 3 are realized when the CPU 90 executes programs (including an information processing program) stored in the ROM 92 or the HDD 96 or programs (including the information processing program) read by the portable storage medium drive 99 from the portable storage medium 91. The functions of the units illustrated in FIG. 3 may be realized by an integrated circuit, such as an ASIC or an FPGA, for example.

FIG. 3 illustrates a functional block diagram of the terminal device 70 and the server 10. Hereinafter, the functions of the terminal device 70 and the server 10 are described in detail.

(Functions of the Terminal Device 70)

When the CPU 190 executes the programs, the terminal device 70 functions as a display control unit 12, an input reception unit 14, and a communication unit 16 illustrated in FIG. 3.

The display control unit 12 controls display in the display unit 193 of the terminal device 70. For example, the display control unit 12 displays, in the display unit 193, a linking screen (see, for example, FIG. 11) for linking the product information and the prototype information to the inspection data of the product and the prototype manufactured in the factory. This linking screen includes a tree structure column (column on the left side) and a flow column (on the right side). When the user links the product information or the prototype information to the inspection data in the "Flow" column, the display control unit 12 displays the product information or the prototype information in the "Tree Structure" column in the form of the tree structure.

Furthermore, in response to a request from the user, the display control unit 12 displays a screen for searching for the inspection data and the screen for displaying the inspection data in the display unit 193.

The input reception unit 14 obtains information input by the user through the input unit 195. For example, the input reception unit 14 obtains information input by the user, through the input unit 195, in the linking screen and transfers the information to the display control unit 12. In this case, the display control unit 12 controls the display of the linking screen in accordance with the obtained input information. Further, the input reception unit 14 transmits the information input by the user to the server 10 through the communication unit 16.

The communication unit 16 transmits, to a communication unit 20 of the server 10, the product information or the prototype information linked to the inspection data by the user in the linking screen displayed in the display unit 193. Also, the communication unit 16 transmits other information (for example, search keywords or the like) and commands input by the user to the communication unit 20 of the server 10. Furthermore, the communication unit 16 receives information transmitted from the communication unit 20 of the server 10 and transfers the information to the display control unit 12.

(Functions of the Server 10)

When the CPU 90 executes the programs, the server 10 functions as the communication unit 20, a structure checking unit 22 as a determination unit, a temporary figure number assigning unit 24 as a linking unit, a storage processing unit 25, a figure number adding unit 26, an updating unit 28, and an information providing unit 30 illustrated in FIG. 3.

The communication unit 20 receives the information transmitted from the communication unit 16 of the terminal device 70 and transmits the information to each of the units (22, 24, 26, 28 and 30) of the server 10. Furthermore, the communication unit 20 transmits the information processed by the units to the communication unit 16 of the terminal device 70.

The structure checking unit 22 checks the structure of the product information and the prototype information linked to the inspection data by the user on the linking screen and determines whether the structure satisfies a predetermined condition. The "predetermined condition" according to the present embodiment means that "figure number" information that is the uppermost node of the tree structure is included in the information linked to the inspection data. When the predetermined condition is satisfied, the structure checking unit 22 transmits the information linked to the inspection data to the storage processing unit 25. In contrast, when the predetermined condition is not satisfied, the structure checking unit 22 transmits the information linked to the inspection data to the temporary figure number assigning unit 24. According to the present embodiment, it is assumed that the product information includes the figure number information and the prototype information does not include the figure number information. Therefore, the structure checking unit 22 transmits the product information to the storage processing unit 25 and the prototype information to the temporary figure number assigning unit 24.

Figure 5:
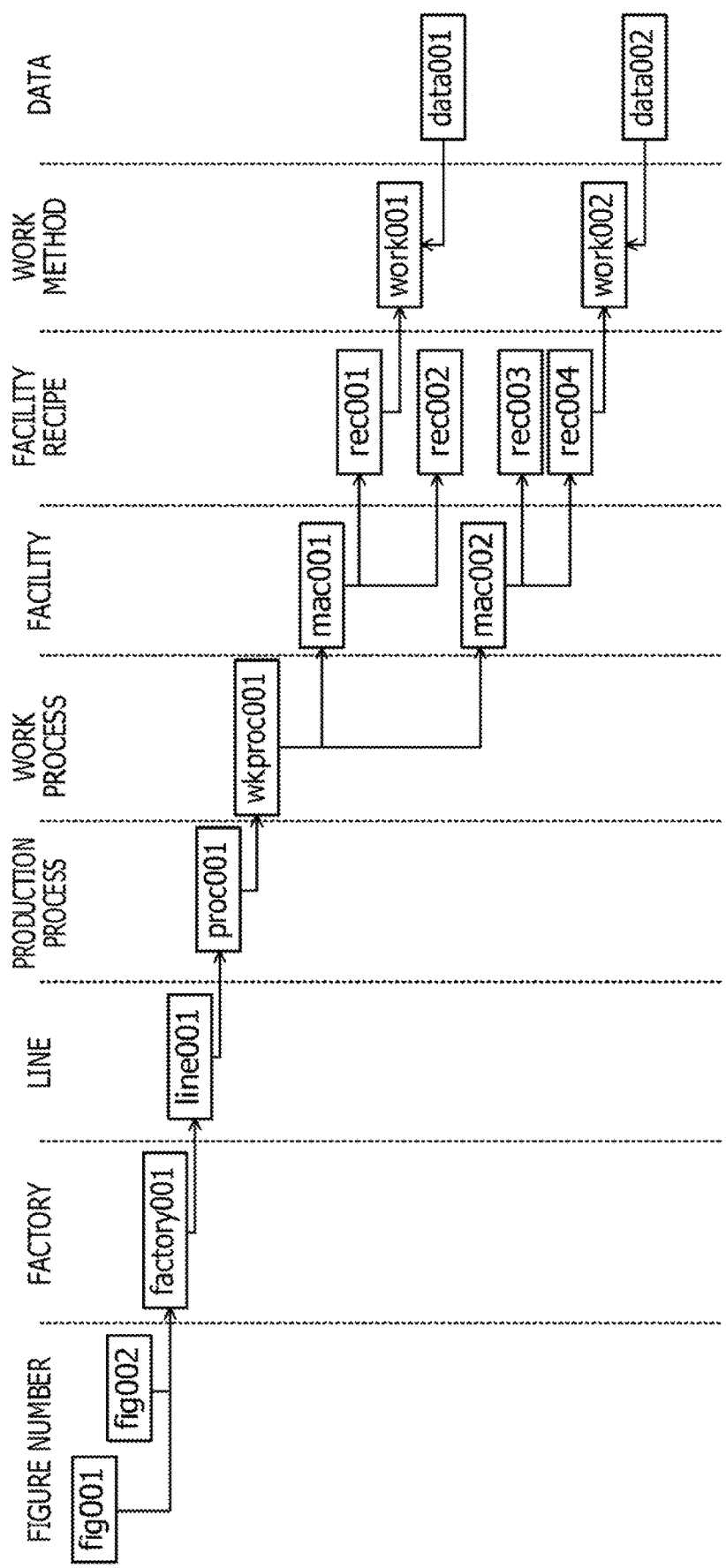
FIG. 5 illustrates an example of product information in the for a hierarchical structure.

The storage processing unit 25 stores the product information received from the structure checking unit 22 in the database 40 serving as a storage unit in accordance with a data format having the hierarchical structure as illustrated in FIG. 5. This data format has a tree structure that includes figure number, a factory, line, a production process, a work process, a facility, a facility recipe, a work method, and data as nodes. Arrows coupling the nodes represent branches. In an example illustrated in FIG. 5, a piece of the inspection data "data001" is stored in the database 40 with a piece of the product information for the figure number "fig001" linked thereto. A piece of the inspection data "data002" is stored in the database 40 with a piece of the product information for the figure number "fig002" linked thereto. The hierarchical structure (tree structure) illustrated in FIG. 5 may be expressed as follows: "figure number>factory>line>production process>work process>facility>facility recipe>work method>data".

Figure 6A:
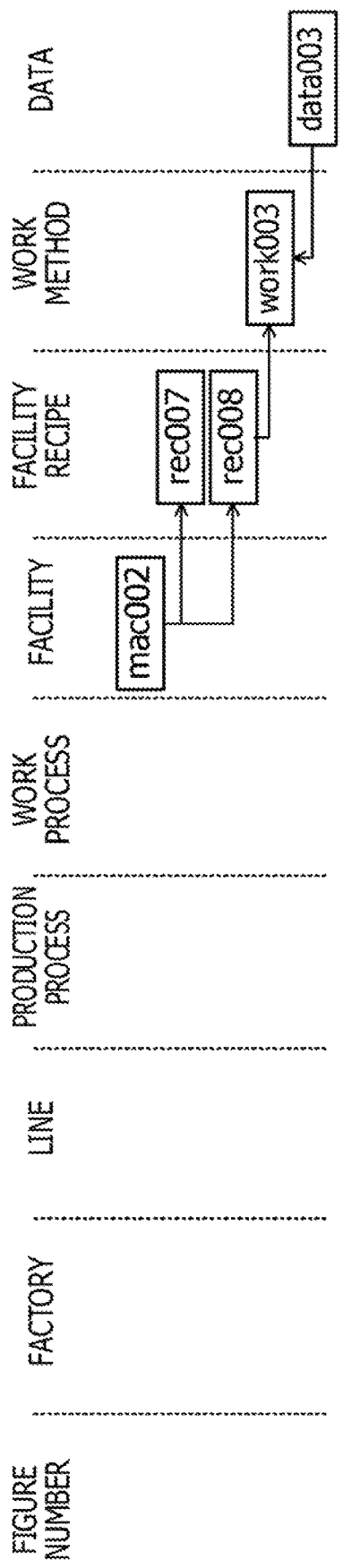
FIGS. 6A and 6B illustrate examples of information of prototypes having a hierarchical structure.
Figure 6B:
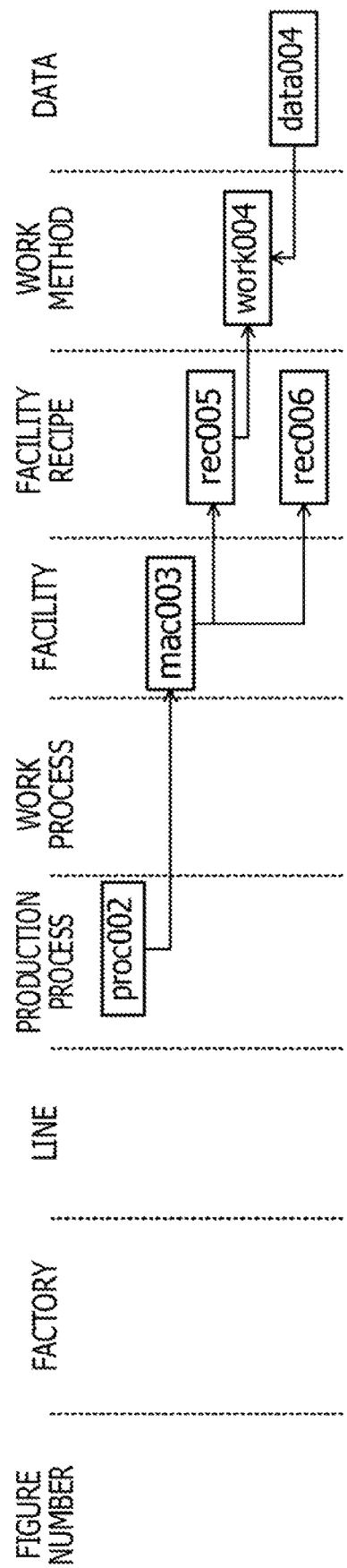

The temporary figure number assigning unit 24 assigns a temporary figure number as the figure number of the prototype to a piece of the prototype information, which includes no figure number information. The temporary figure number is distinguishable from the figure number of the product. For example, pieces of the prototype information that do not include information of the figure number, the factory, the line, the production process, or the work process has a hierarchical structure as illustrated in FIG. A. In this case, the temporary figure number assigning unit 24 assigns temporary figure numbers (for example, "figTmp001" and "figTmp002"), thereby a hierarchical structure as illustrated in FIG. 7A is obtained. For example, when pieces of the prototype information do not include the information of the figure number, the factory, or the line as illustrated in FIG. 6B, the temporary figure number assigning unit 24 assigns temporary figure numbers (for example, "figTmp003" and "figTmp004"), thereby a hierarchical structure as illustrated in FIG. 7B is obtained. When the temporary figure numbers are assigned to the pieces of the prototype information as described above, the temporary figure number assigning unit 24 transmits the pieces of the prototype information to which the temporary figure numbers have been assigned to the storage processing unit 25. When the storage processing unit 25 receives the pieces of the prototype information to which the temporary figure numbers have been assigned (FIGS. 7A and 7B), the storage processing unit 25 stores, the received pieces of the information to the database 40.

Figure 8:
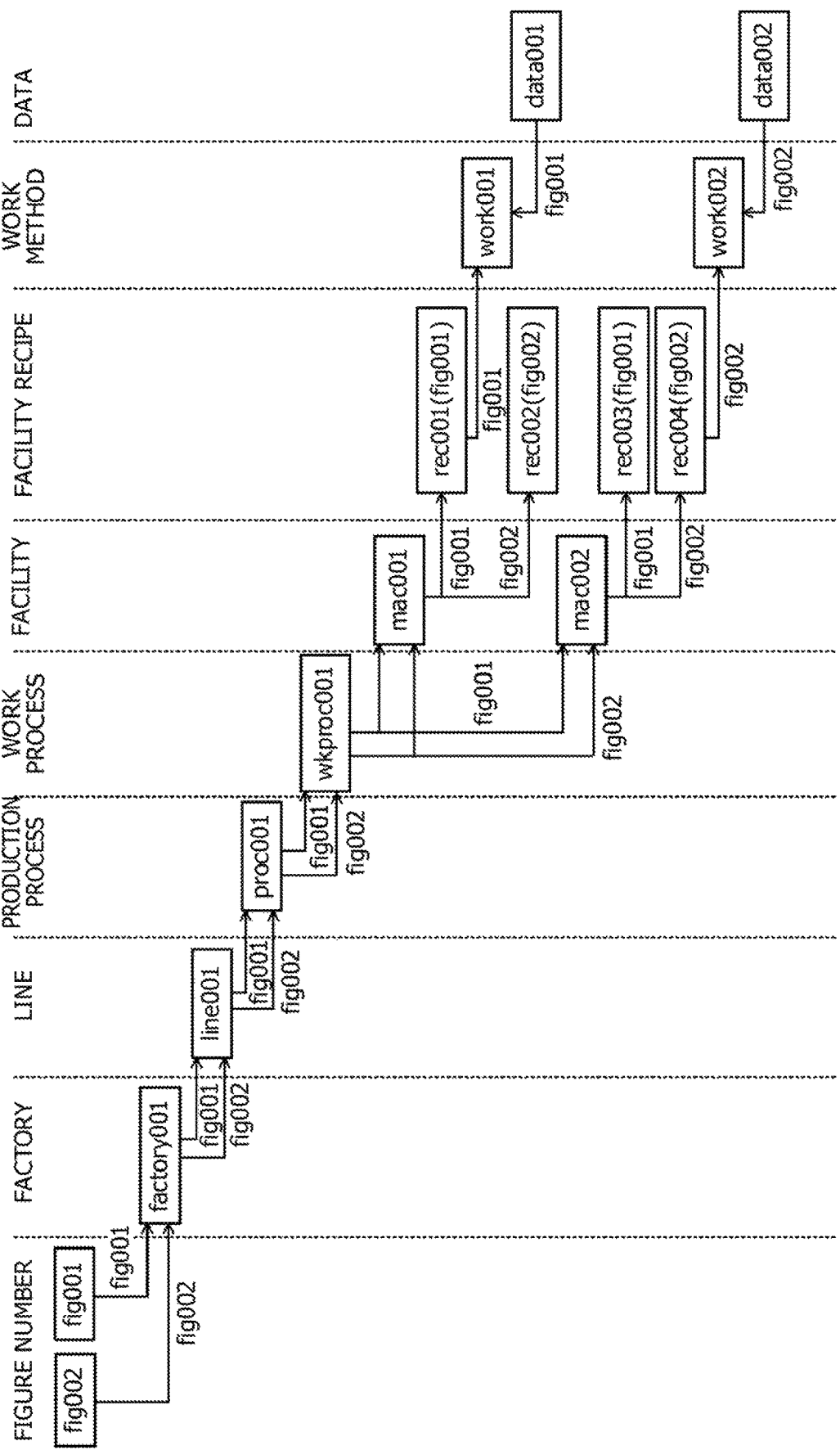
FIG. 8 illustrates a state in which figure numbers are added to branches of the hierarchical structure illustrated in FIG. 5.

As illustrated in FIGS. 8, 9A, and 9B, the figure number adding unit 26 adds the corresponding information of the figure numbers or the temporary figure numbers to the branches (arrows) of the information of the tree structure as illustrated in FIGS. 5, 7A and 7B.

Figure 10:
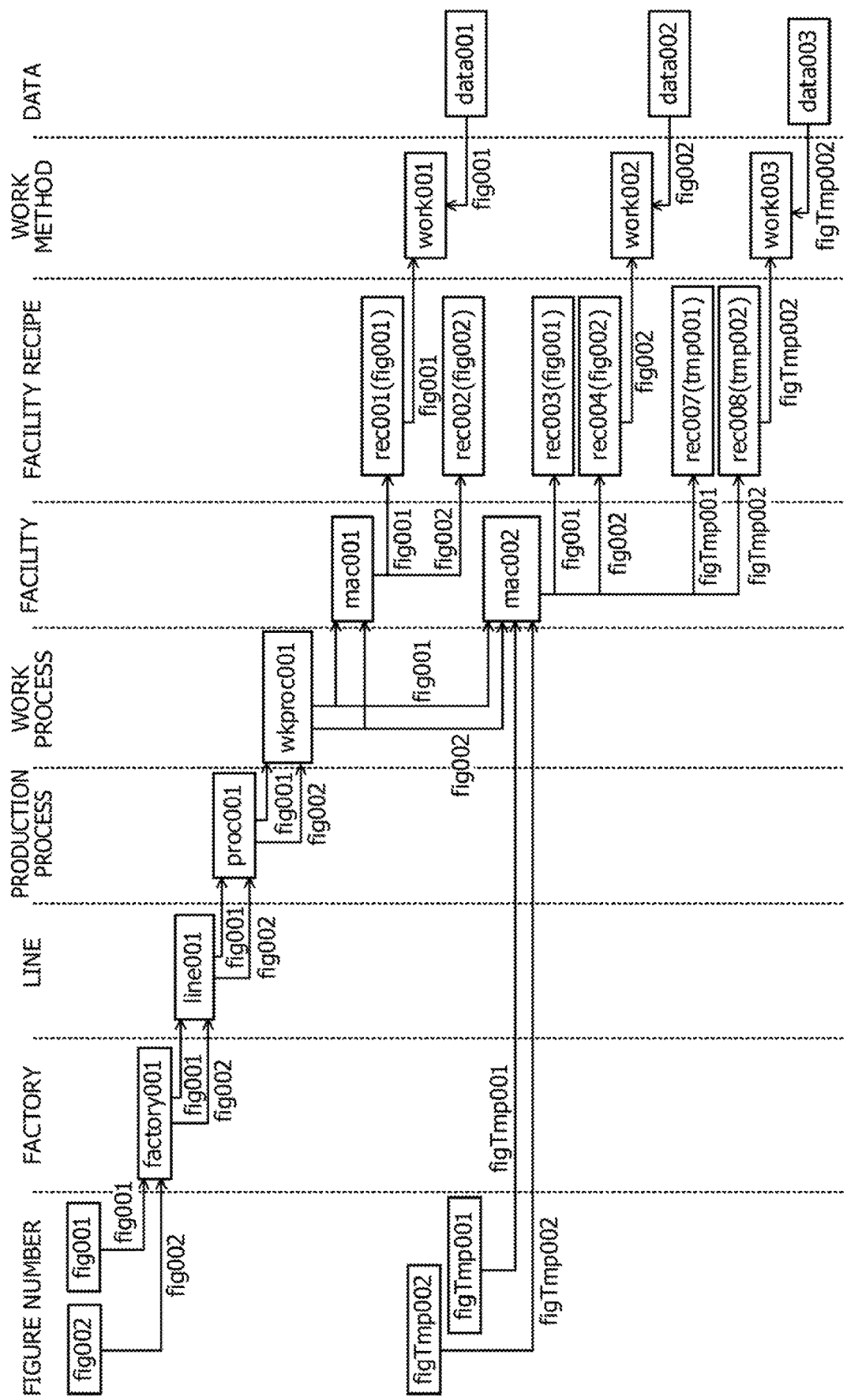
FIG. 10 illustrates information generated from the information illustrated in FIGS. 8 and 9A.

As illustrated in FIGS. 8 and 9A, two or more pieces of information that share a subset of the elements (the facility "mac002" in FIGS. 8 and 9A) are stored in the database 40 in some cases. For this, the storage processing unit 25 has a function of integrating two or more pieces of the information that share a subset of the elements. For example, since the facility "mac002" is shared between the pieces of the information in FIGS. 8 and 9A, the storage processing unit 25 integrates the pieces of the information illustrated in FIGS. 8 and 9A together to generate information as illustrated in FIG. 10 and stores the information to the database 40.

When receiving, from the terminal device 70, information indicating that a piece of the product information or a piece of the prototype information has been changed, the updating unit 28 updates the information stored in the database 40. For example, when the user changes the temporary figure number of a prototype with the terminal device 70, the database 40 is updated with the changed figure number.

The information providing unit 30 extracts from the database 40 data corresponding to the search keyword input in the terminal device 70 and provides the extracted data to the terminal device 70 through the communication unit 20.

(A Data Storage Process of the Server 10)

Next, a data storage process of the server 10 is described in detail with reference to a flowchart illustrated in FIG. 4 and other drawings as appropriate.

Figure 4:
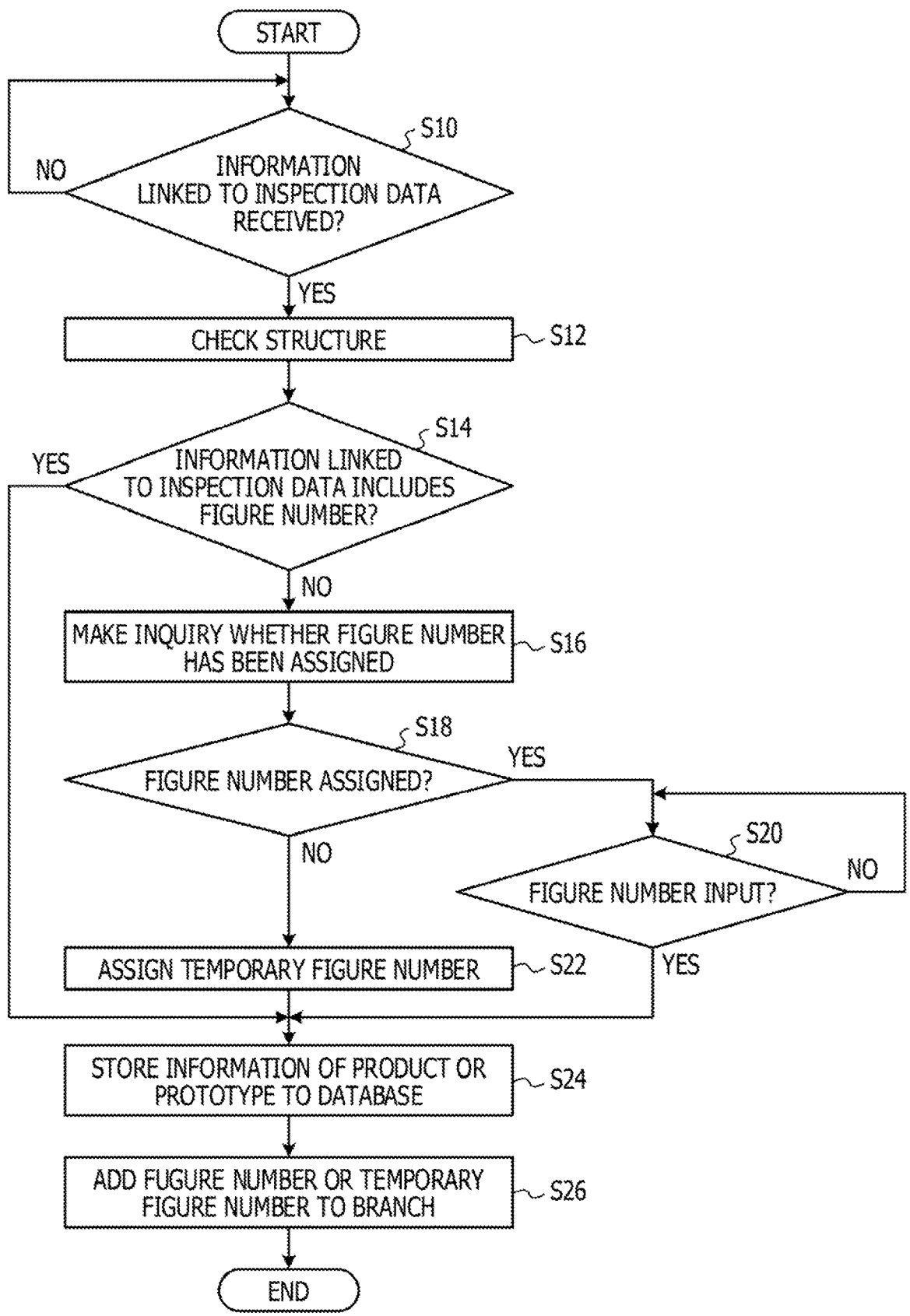
FIG. 4 is a flowchart of a data storage process of the server.
Figure 11:
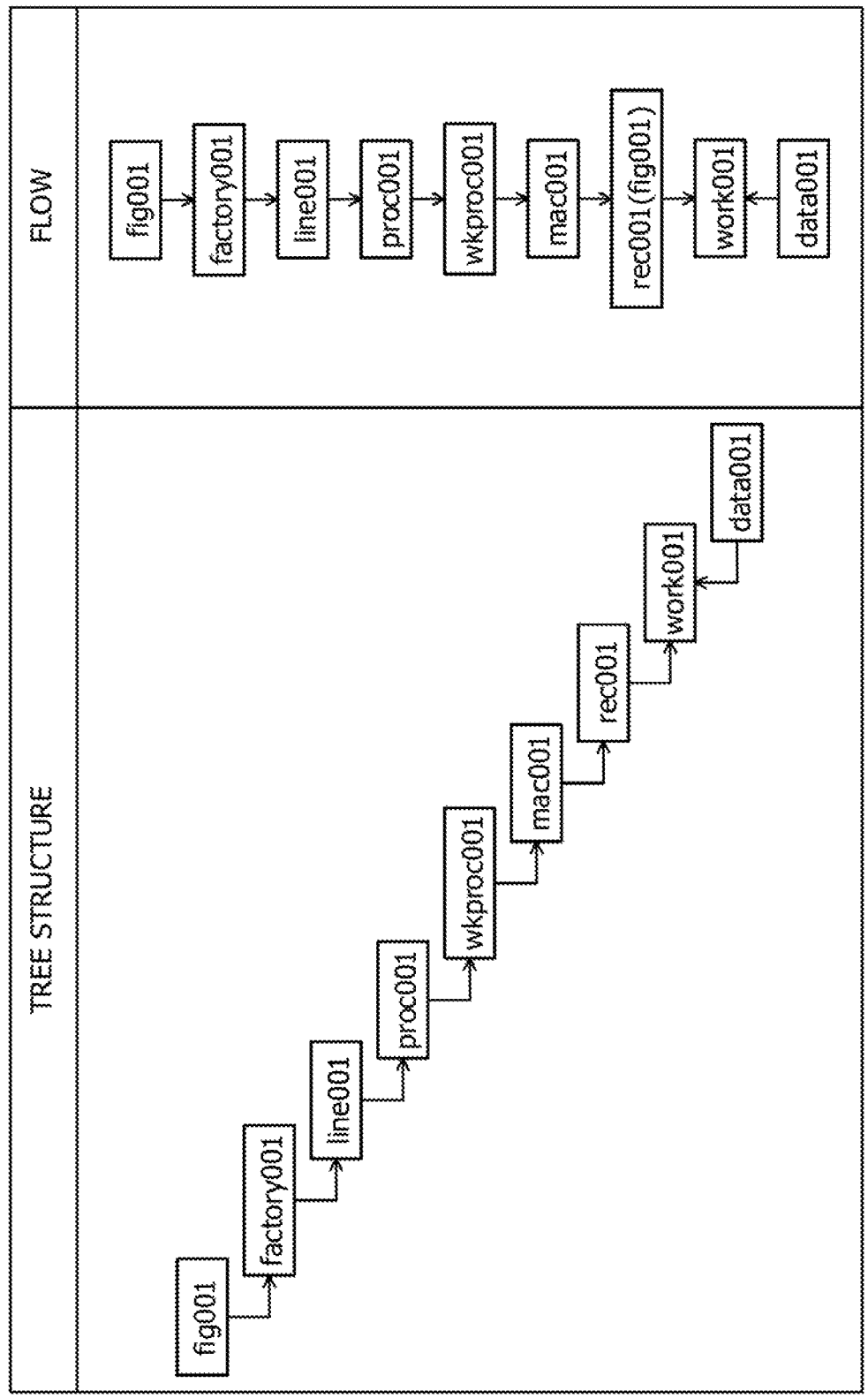
FIG. 11 illustrates a state in which product information is input to a linking screen.
Figure 12:
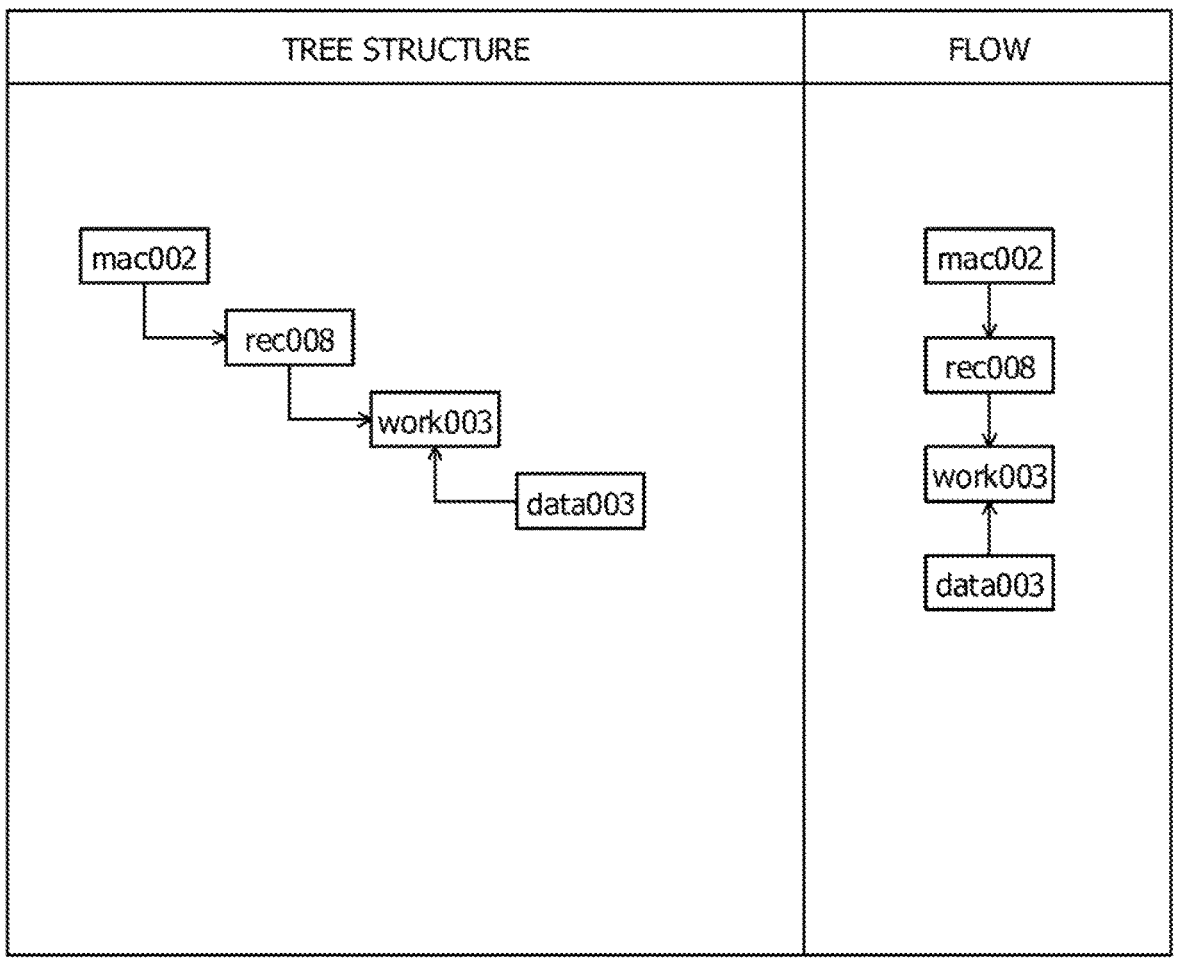
FIG. 12 illustrates a state in which prototype information is input to the linking screen.

The process illustrated in FIG. 4 assumes that the user specifies, in the terminal device 70, a piece of the inspection data stored in the database 40 of the server 10 to display the linking screen as illustrated in FIG. 11 in the display unit 193. Then, the user performs an operation to link a piece of the product information or a piece of the prototype information to the piece of the inspection data in the linking screen through the input unit 195. For example, when the user links the piece of the product information (figure number "fig001") to the piece of the inspection data "data001", the user inputs the information (figure number, factory, line, production process, work process, facility, facility recipe, work method) in the "Flow" column of the linking screen as illustrated in FIG. 11. For example, when the user links the piece of the prototype information (figure number undetermined) to the piece of the inspection data "data003", the user inputs the determined information (facility, facility recipe, work method herein) in the "Flow" column on the right side of the linking screen as illustrated in FIG. 12. When the linking operation is completed in the linking screen, the user inputs the completion of the operation through the input unit 195. In accordance with this input, the communication unit 16 of the terminal device 70 transmits to the server 10 the piece of the information linked to the piece of the inspection data in the linking screen.

In the process illustrated in FIG. 4, first, the structure checking unit 22 waits until a piece of the information linked to a piece of the inspection data is received in step S10. When a piece of the information linked to a piece of the inspection data is transmitted from the terminal device 70, the structure checking unit 22 proceeds to step S12.

When the structure checking unit 22 proceeds to step S12, the structure checking unit 22 checks the structure. For example, the structure checking unit 22 checks whether the piece of the information linked to the piece of the inspection data includes information of the figure number that is the uppermost node in the tree structure.

Next, in step S14, as a result of the structure check in step S12, the structure checking unit 22 determines whether the piece of the information linked to the piece of the inspection data includes the information of the figure number. When the determination in step S14 is positive, the process proceeds to step S24. When the determination is negative, the process proceeds to step S16.

When the determination in step S14 is positive and the process proceeds to step S24, the storage processing unit 25 links the piece of the product information to the piece of the inspection data and stores the piece of the product information to the database 40.

Figure 13A:
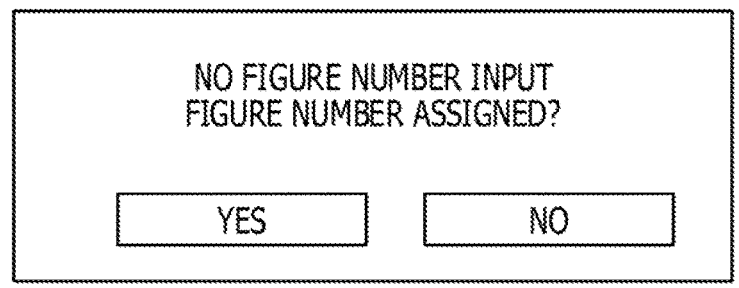
FIG. 13A illustrates a screen displayed in step S16 illustrated in FIG. 4.

In contrast, when the determination in step S14 is negative and the process proceeds to step S16, the temporary figure number assigning unit 24 makes an inquiry, through the communication unit 20, to the terminal device 70 whether the figure number has been assigned. For example, the temporary figure number assigning unit 24 issues an instruction to the display control unit 12 of the terminal device 70 to display a screen in the display unit 193. This screen displays, as illustrated in FIG. 13A, a message "No figure number input. Figure number assigned?" and buttons with which "YES" and "NO" are selectable.

Figure 13B:
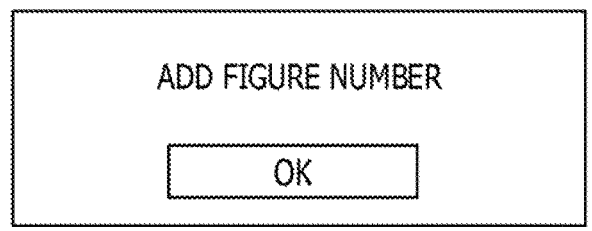
FIG. 13B illustrates a screen displayed when determination in step S18 illustrated in FIG. 4 is positive.

Next, in step S18, the temporary figure number assigning unit 24 determines whether the figure number has been assigned. For example, the temporary figure number assigning unit 24 determines whether the user presses the "YES" button in the screen illustrated in FIG. 13A. When the determination in step S18 is positive, the temporary figure number assigning unit 24 proceeds to step S20. In step S20, the temporary figure number assigning unit 24 issues an instruction to the display control unit 12 of the terminal device 70 to display a screen as illustrated in FIG. 13B in the display unit 193 and waits until the user inputs the figure number. A message saying that "Add a figure number" and an "OK" button are displayed in the screen illustrated in FIG. 13B. As described above, even when the user forgets the linking of the figure number in linking a piece of the product information to a piece of the inspection data, displaying the screens illustrated in FIGS. 13A and 13B may urge the user to link the figure number. When the user inputs the figure number, the process proceeds to step S24, and the storage processing unit 25 links the piece of the product information to the piece of the inspection data and stores the piece of the product information to the database 40.

Figure 13C:
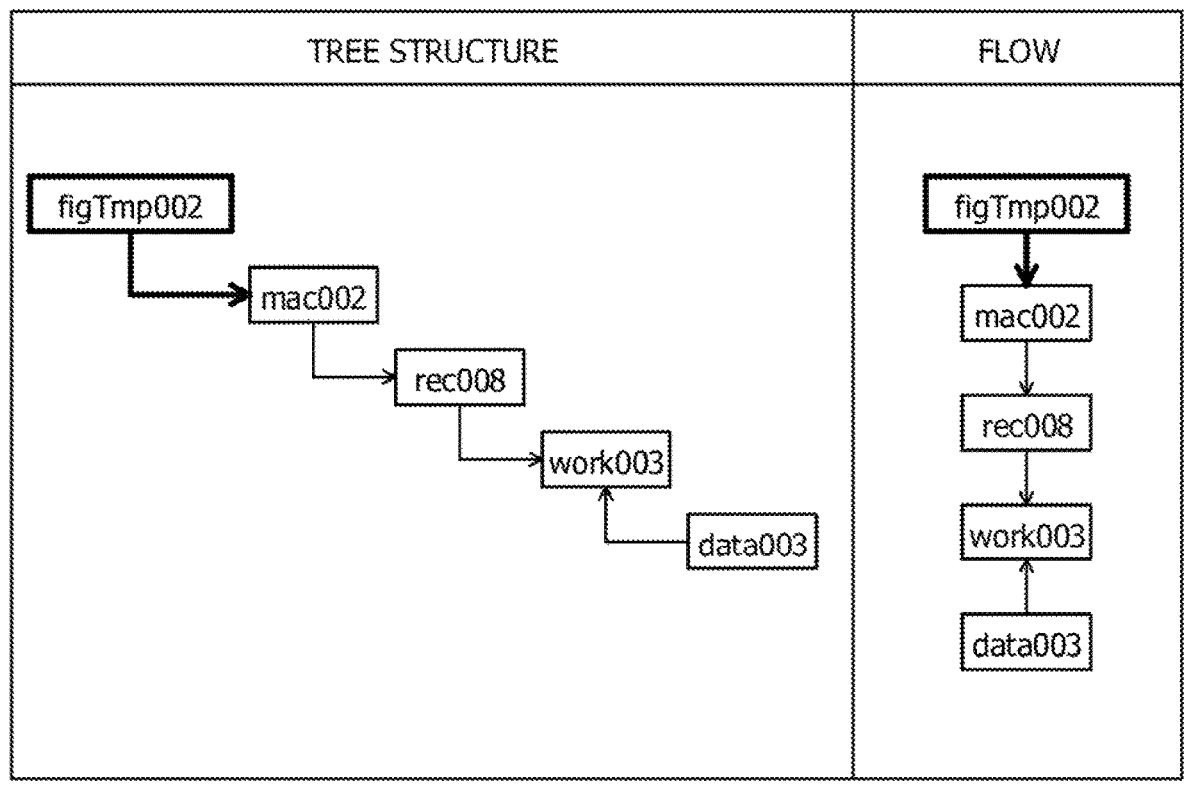
FIG. 13C illustrates the linking screen after processing in step S22 illustrated in FIG. 4 has been performed.

In contrast, when the determination in step S18 is negative, for example, when the user presses the "NO" button in the screen illustrated in FIG. 13A, the temporary figure number assigning unit 24 proceeds to step S22. When the temporary figure number assigning unit 24 proceeds to step S22, the temporary figure number assigning unit 24 assigns, to the piece of the information linked to the piece of the inspection data, a temporary figure number distinguishable from the figure number of the product. According to the present embodiment, for example, it is assumed that a temporary figure number "figTmpXXX" (XXX is a serial number) is assigned. The temporary figure number assigning unit 24 transmits the information of the assigned temporary figure number to the display control unit 12 of the terminal device 70. Thus, as illustrated in FIG. 13C, the display control unit 12 is able to display the temporary figure number in the linking screen. After that, in step S24, the storage processing unit 25 stores to the database 40 the piece of the information to which the temporary figure number is assigned and which is linked to the piece of the inspection data.

Figure 14:
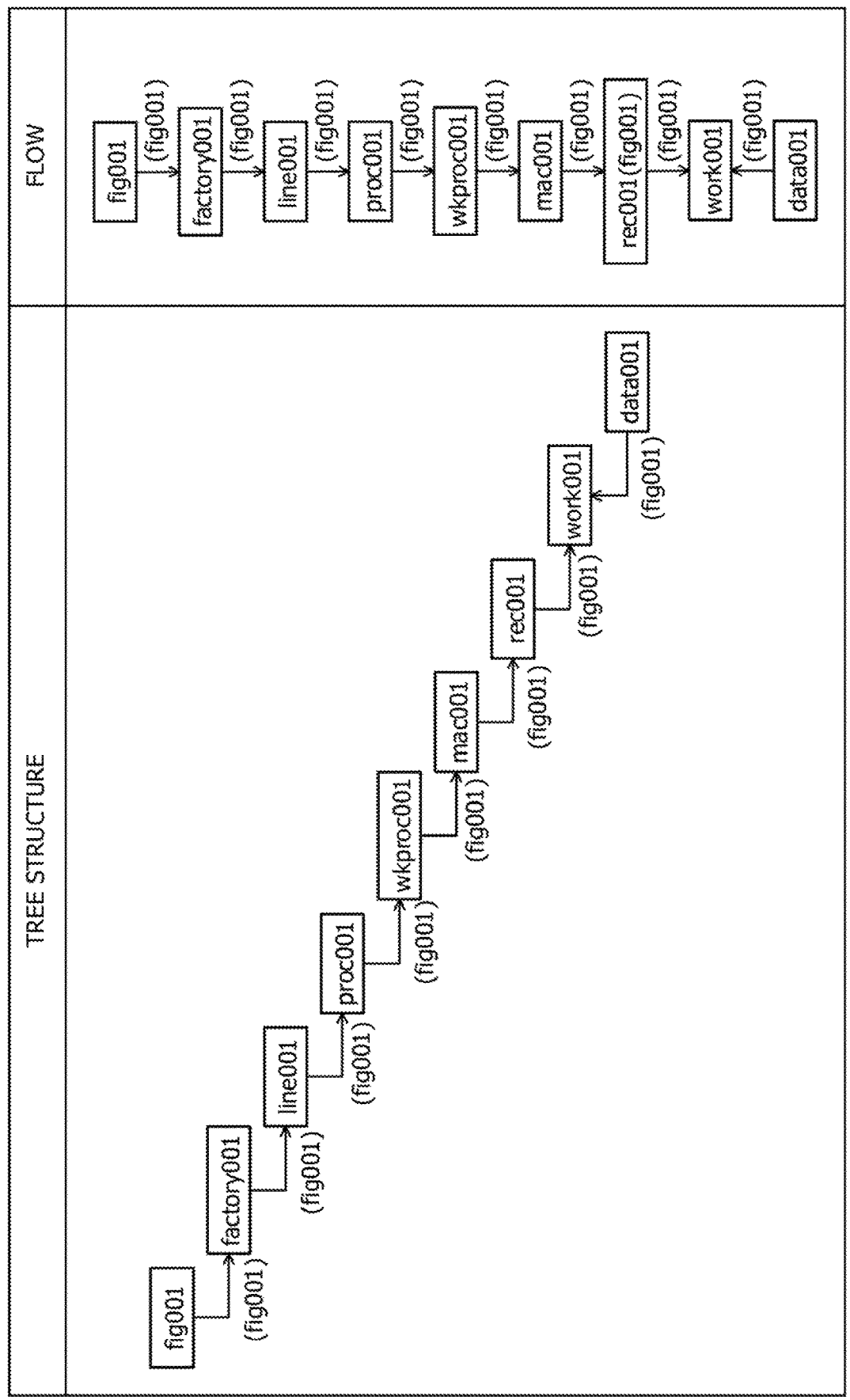
FIG. 14 is a diagram (No. 1) illustrating the linking screen after processing in step S26 illustrated in FIG. 4 has been performed.
Figure 15:
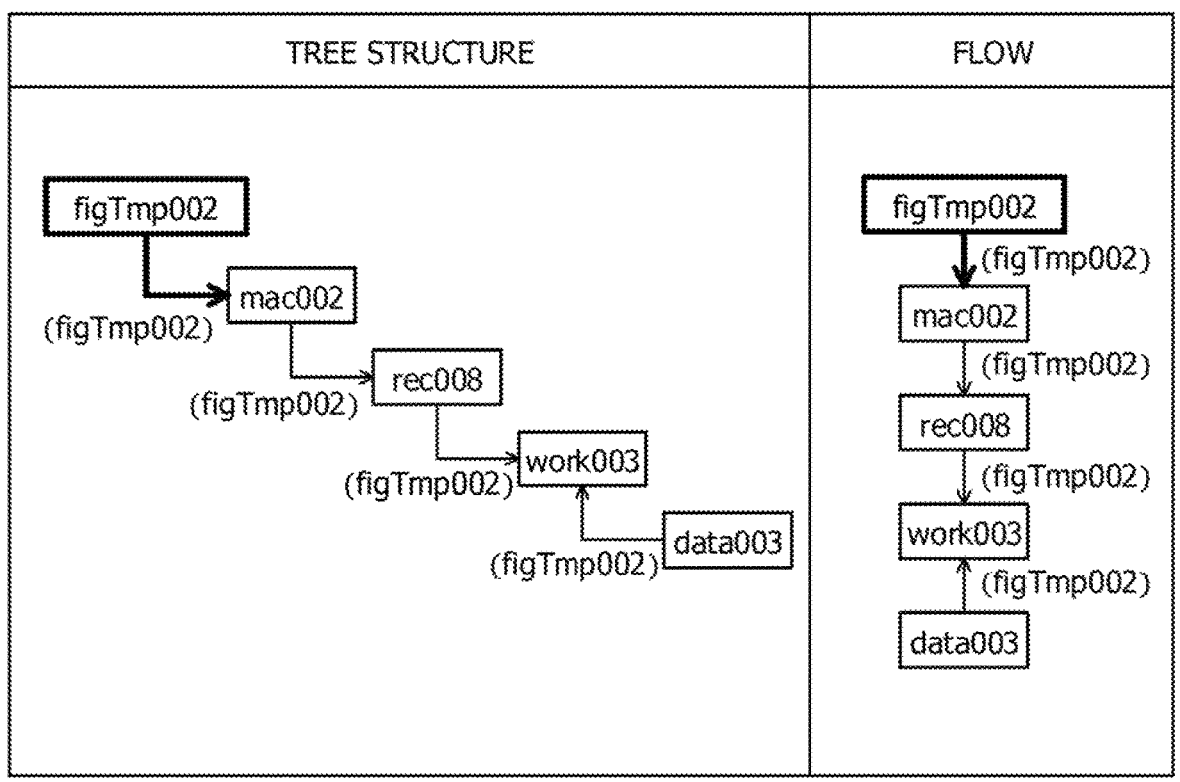
FIG. 15 is a diagram (No. 2) illustrating the linking screen after the processing in step S26 illustrated in FIG. 4 has been performed.

Next, in step S26, the figure number adding unit 26 adds a corresponding figure number or temporary figure number to the branches (arrows between nodes) of the piece of the product information or the piece of the prototype information stored in the database 40 (see FIGS. 8, 9A, and 9B). The figure number adding unit 26 transmits a result of the processing in step S26 to the display control unit 12 of the terminal device 70. In this way, as illustrated in FIGS. 14 and 15, the display control unit 12 is able to display the figure number or the temporary figure number such that the figure number or the temporary figure number is associated with the arrows displayed in the linking screen.

It is assumed that the storage processing unit 25 integrates pieces of the information as illustrated in FIG. 10 and stores the pieces of the information when part of a piece of the product information or part of a piece of the prototype information includes a subset of the elements common to the other piece of the product information or the other piece of the prototype information (a subset of the elements are common as is the case with the facility "mac002" in FIGS. 8 and 9A).

Thus, the entire process illustrated in FIG. 4 ends.

Figure 16:
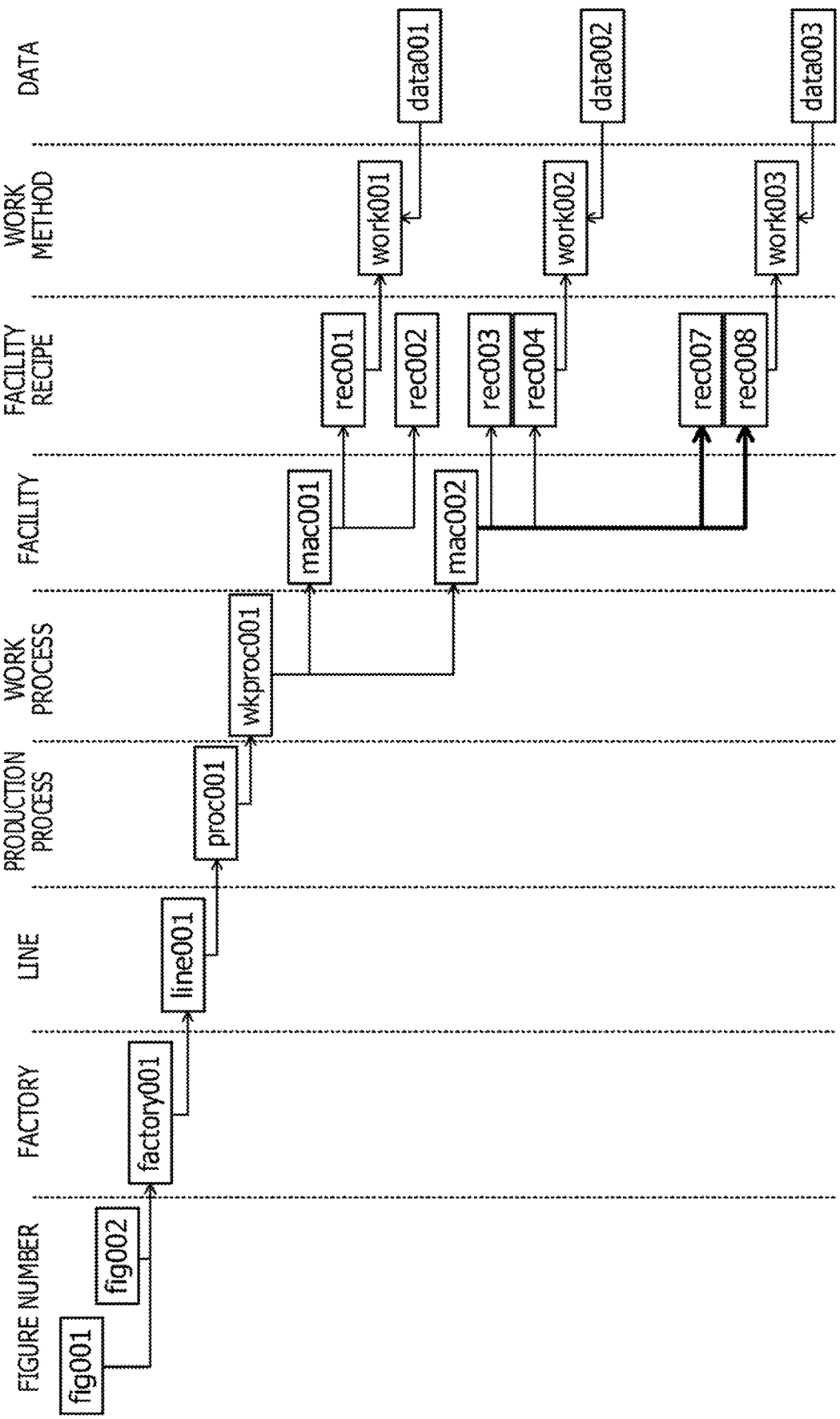
FIG. 16 illustrates a comparative example.

A comparative example is described. FIG. 16 illustrates an example in which a piece of the prototype information is stored in the database 40 without a temporary figure number assigned thereto. In the example illustrated in FIG. 16, information of the figure number is not linked to a piece of the prototype data "data003", and the facility "mac002" is common to the facilities "mac002" of the figure numbers "fig001" and "fig002". Thus, the piece of the prototype data "data003" is managed in the database 40 such that the piece of prototype data "data003" is linked to the figure numbers "fig001" and "fig002" at the facility "mac002". With such management, the inspection data of the prototype is managed as data related to different products. Thus, the inspection data of the prototype is not able to be appropriately used (for example, searched). In contrast, according to the present embodiment, as illustrated in FIG. 10, the prototype data "data003" is managed in the database 40 such that the prototype data "data003" is linked to the temporary figure number "figTmp002". In this way, according to the present embodiment, the prototype data "data003" is able to be managed independently of the figure numbers "fig001" or "fig002". Accordingly, the inspection data of the prototype may be appropriately used (for example, searched).

As has been described in detail, the server 10 according to the present embodiment includes the database 40 that stores the inspection data of the product manufactured in the manufacturing line in the factory in accordance with the tree structure data format of figure number>factory>line>production process>work process>facility>facility recipe>work method>data. When a piece of the inspection data of the prototype is stored to the database 40, the structure checking unit 22 checks whether the information of the uppermost node of the tree structure (figure number) is linked to the piece of the inspection data of the prototype. When the information of the figure number is not linked, the temporary figure number assigning unit 24 links the temporary figure number distinguishable from the figure number of the product to the piece of the inspection data of the prototype as the figure number of the prototype, and the storage processing unit 25 stores to the database 40 the piece of the inspection data of the prototype to which the temporary figure number is linked. When the piece of the inspection data of the prototype is not linked to the figure number, as has been described, the temporary figure number is assigned for the database 40 to manage the piece of the inspection data of the prototype. Thus, the piece of the inspection data of the prototype is not managed in a state in which the piece of the inspection data of the prototype is associated with the product manufactured in the same line or the same facility. Accordingly, the inspection data of the prototype may be appropriately managed in the database 40 such that the inspection data is able to be used (for example, able to be searched). For example, when a search is performed with the figure number of the product used as a search keyword, search of the information of the prototype irrelevant to the product may be suppressed.

According to the present embodiment, the figure number adding unit 26 adds the figure number information to the branches (arrows) coupling the nodes in the tree structure. Thus, even when the tree structure is complex as illustrated in FIG. 10, linkage between pieces of the inspection data and the respective figure numbers (or temporary figure numbers) may be easily searched.

According to the present embodiment, when the temporary figure number linked to a piece of the inspection data of the prototype is corrected by the user, the updating unit 28 corrects (updates) the temporary figure number stored in the database 40 with a new figure number. Thus, when a prototype is manufactured as an actual product, the piece of the inspection data of the prototype is able to be used as the product data.

The tree structure described according to the above-described embodiment is an example. For example, a subset of "factory", "line", "production process", "work process", "facility", "facility recipe", and "work method" described according to the above embodiment may be omitted from the information linked to the inspection data.

Although the server 10 includes the database 40 according to the above-described embodiment, it is not limiting. The database 40 may be included in a device other than the server 10 (for example, a data server or an external storage device). A subset of the functions included in the server 10 (FIG. 3) may be included in another device. The other device may be another server or the terminal device 70 illustrated in FIG. 3. For example, the structure checking unit 22 and the temporary figure number assigning unit 24 included in the server 10 in FIG. 3 may be included in the terminal device 70.

The above-described processing functions may be realized by a computer. In this case, a program is provided. In the program, the details of the processing of the functions that a processing device is supposed to have are described. The above-described processing functions are realized in the computer when the computer executes the program. The program in which the processing details are described may be recorded in a computer-readable storage medium (except for a carrier wave).

To distribute the program, a portable storage medium storing the program is marketed, for example. The portable storage medium is a digital versatile disc (DVD), a compact disc read-only memory (CD-ROM), or the like. The program may be stored in a storage device of a server computer and transferred from the server computer to another computer through a network.

For example, the computer that executes the program stores to the storage device thereof the program recorded in the portable storage medium or the program transferred from the server computer. Then, the computer reads the program from the storage device thereof and executes processes in accordance with the program. The computer may read the program directly from the portable storage medium and execute the processes in accordance with the program. Every time the program is transferred from the server computer to the computer, the computer may sequentially execute the processes in accordance with the program.

The above-described embodiment is an example of a preferred embodiment. However, it is not limiting. Various modifications may be made without departing from the gist of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory configured to store data generated in a manufacturing line where a product is manufactured in a state in which the data is linked to information in a form of a tree structure in which elements related to manufacture of the product assigned as nodes, the data generated in the manufacturing line where the product is manufactured is stored in the memory in accordance with a data format having a hierarchical structure of product figure number>manufacturing factory>manufacturing line>production process>work process>manufacturing facility>facility recipe>work method>data; and
a processor coupled to the memory and configured to:
determine, when data of a prototype manufactured by using a facility in the manufacturing line is stored to the memory, whether information of an element out of the elements corresponding to an uppermost node out of the nodes of the tree structure is linked to the data of the prototype;
link, when the information of the element corresponding to the uppermost node is not linked, as the information of the element corresponding to the uppermost node of the data of the prototype, information distinguishable from information of the element corresponding to the uppermost node of the tree structure linked to the data of the product;
store in the memory the data of the prototype to which the distinguishable information is linked;
determine whether the product figure number is linked to the data of the prototype;
link, when the product figure number is not linked, a prototype figure number as the product figure number of the data of the prototype distinguishable from the product figure number, linked to the data of the product; and
store in the memory the data of the prototype to which the prototype figure number is linked.

2. The information processing apparatus according to claim 1, wherein the information of the element corresponding to the uppermost node is identification information of the product or the prototype.

3. The information processing apparatus according to claim 1, wherein the information of the element corresponding to the uppermost node is added to a branch coupling the nodes in the tree structure.

4. The information processing apparatus according to claim 1, wherein the processor is configured to: update, when the distinguishable information linked to the data of the prototype is corrected, the memory with the corrected information.

5. An information processing method comprising:
determining, by a computer, when data of a prototype manufactured by using a facility in a manufacturing line where a product is manufactured is stored to a memory that stores data generated in the manufacturing line in a state in which is the data is linked to information in a form of a tree structure in which elements related to manufacture of the product are assigned as nodes, whether information of an element out of the elements corresponding to an uppermost node out of the nodes of the tree structure is linked to the data of the prototype, the data generated in the manufacturing line where the product is manufactured is stored in the memory in accordance with a data format having a hierarchical structure of, product figure number>manufacturing factory>manufacturing line>production process>work process>manufacturing facility>facility recipe>work method>data, the determining determines whether the product figure number is linked to the data of the prototype;
linking, when the information of the element corresponding to the uppermost node is not linked, as the information of the element corresponding to the uppermost node of the data of the prototype, information distinguishable from information of the element corresponding to the uppermost node of the tree structure linked to the data of the product, the linking links, when the product figure number is not linked, a prototype figure number as the product figure number of the data of the prototype distinguishable from the product figure number linked to the data of the product; and
storing in the memory the data of the prototype to which the distinguishable information is linked, the storing stores to the memory the data of the prototype to which the prototype figure number is linked.

6. A non-transitory computer-readable recording medium having stored therein a program for causing a computer to execute a process for storing data, the process comprising:
determining, when data of a prototype manufactured by using a facility in a manufacturing line where a product is manufactured is stored to a memory that stores data generated in the manufacturing line in a state in which the data is linked to information in a form of a tree structure in which elements related to manufacture of the product are assigned as nodes, whether information of an element out of the elements corresponding to an uppermost node out of the nodes of the tree structure is linked to the data of the prototype, the data generated in the manufacturing line where the product is manufactured is stored in the memory in accordance with a data format having a hierarchical structure of, product figure number>manufacturing factory>manufacturing line>production process>work process>manufacturing facility>facility recipe>work method>data;
linking, as a result of the determining, when the information of the element corresponding to the uppermost node is determined not to have been linked, as the information of the element corresponding to the uppermost node of the data of the prototype, information distinguishable from information of the element corresponding to the uppermost node of the tree structure linked to the data of the product; and
storing to the memory the data of the prototype to which the distinguishable information is linked, the determining determines whether the product figure number is linked to the data of the prototype, the linking links, when the product figure number is not linked, a prototype figure number as the product figure number of the data of the prototype distinguishable from the product figure number linked to the data of the product, and the storing stores to the memory the data of the prototype to which the prototype figure number is linked.

7. The non-transitory computer-readable recording medium according to claim 6, wherein the information of the element corresponding to the uppermost node is identification information of the product or the prototype.

8. The non-transitory computer-readable recording medium according to claim 6, wherein the information of the element corresponding to the uppermost node is added to a branch coupling the nodes in the tree structure.

9. The non-transitory computer-readable recording medium according to claim 6, the process further comprising: updating, when the distinguishable information linked to the data of the prototype is corrected, the memory with the corrected information.

* * * * *